Nov. 21, 1961

H. J. VENEMA 3,009,990

SYNCHRONIZING PULSE CLIPPER

Filed July 17, 1956

INVENTOR:
HARRY J. VENEMA,
BY Charles M. Hutchins
HIS ATTORNEY.

United States Patent Office 3,009,990

Patented Nov. 21, 1961

3,009,990

SYNCHRONIZING PULSE CLIPPER

Harry J. Venema, Wheaton, Ill., assignor to General Electric Company, a corporation of New York Filed July 17, 1956, Ser. No. 598,308

15 Claims. (Cl. 178—7.3)

This invention relates to the separation of signal portions distinguished by different amplitudes, and more particularly to a network utilizing ferromagnetic phenomena for this purpose.

The present standard U.S. television signal transmits synchronizing pulses as signals occupying the upper 25% of the carrier modulation range, with black indicated by a modulation level corresponding approximately to 75% of the carrier modulation range. Synchronizing pulses are transmitted during the time when the receiver display is blanked by the black level signal, and are shorter in duration than the blanking signal. When viewed graphically by plotting voltage levels against time, the synchronizing pulse appears as a short pulse superimposed upon the wider blanking signal. The synchronizing pulses are routed separately to the synchronizing circuits by suitable amplitude discriminating networks. The operation of separation is frequently referred to as "sync clipping," which is to say that the "sync" signal is "clipped" out of the composite video signal. Customarily, this is done by feeding the composite signal to an amplifier and noise suppressor circuit, and then to a "clipper" stage which performs the function of separation. The clipper can consist of a diode or a triode biased beyond cut-off, and the voltage level of the clipping can be determined by an automatic gain control voltage derived from an appropriate portion of the composite signal. Vacuum tubes and semi-conductor devices have been proposed or used for this purpose.

It is an object of this invention to provide an improved synchronizing pulse clipper.

Another object of this invention is to provide a synchronizing pulse clipper of unusual durability and long life.

A further object of this invention is to provide a new and novel discriminating network utilizing the magnetic properties of materials having substantially rectangular major and minor hysteresis loops.

Further objects and advantages of my invention will become apparent from a detailed study of the specification and attached drawings.

In one embodiment of my invention illustrative of the principles thereof, a signal is fed to a saturable inductance having a core with hysteresis characteristics that are substantially rectangular. The signal consists of a wide blanking pulse which forms a pedestal, and a narrower synchronizing pulse superimposed on the pedestal near its center. A biasing current, having an equivalent magnetomotive force to the magnetomotive force which is set up in the core by the pedestal, is fed to the saturable inductance. This biasing current normally maintains the core saturated in one direction before the arrival of the signal. Upon the arrival of the leading edge of the pedestal the magnetomotive force, developed in the core thereby, drives the core flux along the hysteresis loop from a point in the region of saturation to a point near the knee of the hysteresis loop, preparing the core to leave saturation. When the leading edge of the synchronizing pulse arrives, the core is driven on into the unsaturated region and the synchronizing pulse appears across the inductance. In one embodiment, the synchronizing pulse is not of sufficient magnitude to drive the core to saturation in the other direction, whereby the entire synchronizing pulse appears across the winding. At the arrival of the trailing edge of the synchronizing pulse the magnetomotive force produced by the biasing current and the magnetomotive force generated by the remainder of the pedestal are again approximately equal and the core proceeds along the hysteresis loop in a direction of constant flux since the minor hysteresis loops are also substantially rectangular. Then upon the arrival of the trailing edge of the pedestal the biasing current drives the core back to its initial state of saturation.

In another embodiment of my invention aperture clipping is achieved using the same type of saturable inductance by merely setting the voltages at different levels. Thus, if the magnetomotive force produced by the pedestal is less than, and opposite in direction to, the magnetomotive force which is produced by the biasing current, upon the arrival of the leading edge of the pedestal the flux in the core will not proceed all the way to an outside knee of the hysteresis loop. If the magnitude of the synchronizing pulse is sufficiently high, the synchronizing pulse will very quickly drive the core from saturation in the sense produced by the bias magnetomotive force to saturation in the opposite sense. A signal having a stabilized volt-second area will appear across the inductance substantially at the time of the leading edge of the synchronizing pulse. Since the magnetic state of the core is completely reversed in a time less than the duration of the synchronizing impulse, the signal across the inductance indicating the arrival of the leading edge of the synchronizing pulse disappears before the synchronizing pulse has terminated. Upon the arrival of the trailing edge of the synchronizing pulse, the magnetomotive force produced by the remainder of the pedestal is again less than that produced by the biasing means and the core returns to its initial stage of saturation. During the return a pulse of reverse polarity, indicating the trailing edge of the synchronizing pulse, appears across the inductance. Suitable preparation of the magnetic bias with respect to the pedestal level permits the trailing edge pulse to be of lesser magnitude and greater duration.

Figure 1:
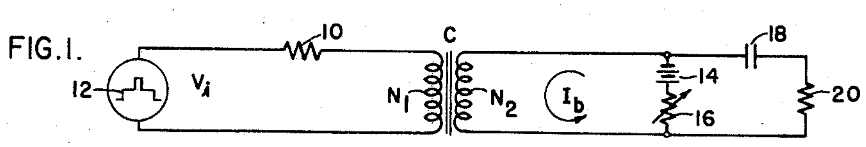
FIG. 1 is an illustration of a saturable inductance pulse clipping circuit.

Referring to the drawings, in FIG. 1, the structure of the saturable inductance used for the synchronizing pulse clipper is illustrated. The signal winding $N_1$ is fed from source 12 in series with a current limiting resistor 10, referred to in later mathematical expressions as R. The biasing current $I_b$ is shown as applied to another winding $N_2$ by connection to the unidirectional source 14 and resistance 16 in series across the end leads thereof. In the following mathematical expressions $N_1$ and $N_2$ will also be used to indicate the number of turns in the respective windings. Both windings $N_1$ and $N_2$ are on a saturable core C having a high squareness ratio, $B_r/B_s$, where $B_r$ is the residual flux density and $B_s$ is the saturation flux density. The signal voltage $V_1$ is fed to resistance 10 and winding $N_1$ in series. The output can be taken from across winding $N_1$, winding $N_2$ or any other winding on core C. The source 12 represents a source of signals having the characteristics described more fully below, such as the amplifier and detector chain of a television receiver.

Figure 2:
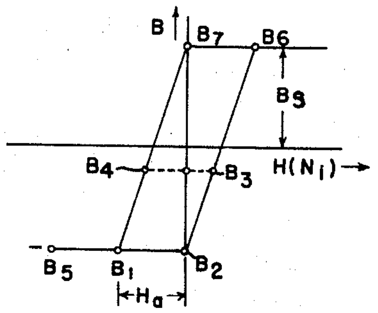
FIG. 2 is a diagram of the hysteresis loop of the core material used in FIG. 1.

In FIG. 2 there is graphically illustrated the relationship of magnetic flux density to magnetizing force in the core C, referred to in FIG. 1. The core saturation flux density is indicated as $B_s$. A minor hysteresis loop is illustrated by tracing around the parallelogram from $B_1$ to $B_2$ to $B_3$ to $B_4$ and back to $B_1$. Core materials are currently available under the designations of General Ceramics material S–1 and S–3 having hysteresis characteristics similar to those shown in FIG. 2.

As shown, then, even the minor hysteresis loops of this type of core material are substantially flat along the H-axis for both positive and negative values of remanent flux density $B_r$, including values which are much less than the saturation flux density $B_s$.

Figure 3:
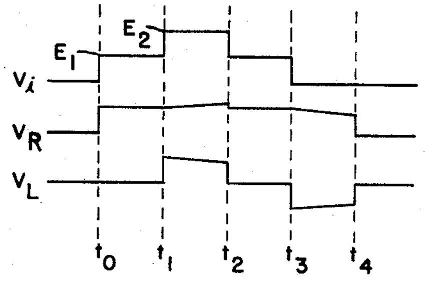
FIG. 3 is a diagram of the voltages appearing across the elements of FIG. 1 in the embodiment of my invention first mentioned above.

In FIG. 3, there are illustrated the voltage diagrams for the first discussed mode of operation. The curve $V_i$ represents the signal voltage and consists of a blanking pulse of magnitude $E_1$ forming a pedestal upon which the synchronizing pulse of magnitude $E_2$ is superimposed. The second voltage diagram shows the voltage which appears across the resistor 10 of FIG. 1. The third voltage diagram illustrates the voltage which appears across the output, e.g. across winding $N_1$ or winding $N_2$ of FIG. 1.

The mode of operation of the pulse clipper illustrated by these curves is as follows: The bias current $I_b$ is made equal to $(E_1/R)\ (N_1/N_2)$. This bias current $I_b$ drives the core C of FIG. 1 out to a point such as $B_5$, shown in FIG. 2, well into negative saturation. At time $t_0$, shown in FIG. 3, the signal voltage $E_1$ constituting the leading edge of the pedestal, is applied. Due to the magnitude of bias current $I_b$, the bias current and this portion of the pedestal provide substantially equal but opposite magnetomotive forces in the core C. The magnetomotive force in the core will proceed along the hysteresis loop, shown in FIG. 2, from the lower left extremity $B_5$ towards the lower right, outside knee of the hysteresis loop $B_2$. However, this force does not significantly change the flux in the core C during the time $t_0$ to $t_1$ because of the predicated magnetic properties, and hence no voltage appears across the winding $N_1$. Therefore, the voltage $E_1$ appears across the resistance 10 since during saturation the impedance presented by resistance 10 is much larger than the impedance presented by the winding $N_1$.

At time $t_1$, shown in FIG. 3, the signal voltage rises to a level $E_2$ which represents the leading edge of the synchronizing pulse. Sufficient magnetomotive force is now developed by the winding $N_1$ to drive the core C out of saturation and to proceed past $B_2$ up the right-hand side of the hysteresis loop of FIG. 2. Since the core is now unsaturated, there is appreciable inductance in the winding $N_1$ and, as is shown in FIG. 3, a voltage $V_L$ appears across winding $N_1$. This voltage $V_L$ remains during the entire period of the synchronizing pulse, from $t_1$ to $t_2$ in FIG. 3, if the incremental volt-second area attributable to level $E_2$ is not sufficient to drive the core C, of FIG. 1, all the way to positive saturation up the right-hand side of the hysteresis loop of FIG. 2 past $B_6$.

We will assume that the magnitude $E_2$ has been sufficient only to drive the core C up to the point $B_3$ shown on the hysteresis loop of FIG. 2 in the time interval $t_1-t_2$. Upon the arrival of the trailing edge of the synchronizing pulse at time $t_2$, shown in FIG. 3, the applied magnetomotive forces due to the bias winding $N_2$ and to the winding $N_1$, of FIG. 1, again become approximately equal. The core now proceeds along the hysteresis loop of FIG. 2 from the point $B_3$ in the direction of the point $B_4$, producing insignificant change in flux and thus no output voltage across the winding $N_1$.

At time $t_3$ of FIG. 3, the trailing edge of the pedestal arrives. The only magnetomotive force then applied to the core C is that due to the current in bias winding $N_2$, which drives the core C from the point $B_4$, of FIG. 2, down the left-hand side of the curve past $B_1$ and back into its initial state of negative saturation at $B_5$. During the time of return to the initial saturation, shown as $t_3$ to $t_4$ in FIG. 3, the change in flux caused by the bias current $I_b$ develops a voltage across the winding $N_1$ opposite in direction to the voltage appearing during the time of the synchronizing pulse and having the same volt-second area. This voltage is illustrated in the last voltage diagram of FIG. 3. Thus the initial pulse in the third voltage diagram of FIG. 3 corresponds in time to the synchronizing pulse, and is isolated from the pedestal pulse, and may be used for synchronizing purposes. Connections for this purpose may be made to winding $N_1$, or to winding $N_2$ by way of capacitor 18 connected to a load 20.

Figure 4:
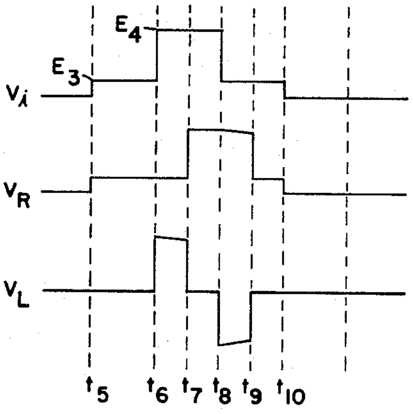
FIG. 4 is a diagram of the voltages appearing across the elements of FIG. 1 in an aperture clipping embodiment of my invention.

FIG. 4 is an illustration of the voltages across the elements of FIG. 1 for a mode of operation in which the synchronizing pulse clipper embodies aperture clipping techniques. The plot $V_i$ of FIG. 4 is again a plot of the signal input voltage. The second plot of $V_R$ of FIG. 4 is a plot of the voltage drop across the resistance 10 in the signal winding circuit. The third plot $V_L$ of FIG. 4 is an illustration of the output voltage which appears on the winding $N_1$ of FIG. 1.

Turning now to a description of the mode of operation of the circuit employing aperture clipping techniques, the mode of operation is once more determined by the voltage levels of the pedestal, here identified as $E_3$, and the synchronizing pulse, here identified as $E_4$, shown as the first plot $V_i$ in FIG. 4. For aperture clipping $E_3$ is enough less than the value of $E_1$ in the previous mode of operation that under the influence of the pedestal portion of the wave, the magnetomotive force travels only to the region to the left of inside knee $B_1$ rather than all the way to outside knee, $B_2$. Previously, $E_1$ was made equal to $I_bR(N_2/N_1)$ and for aperture clipping $$E_3=I_bR(N_2/N_1)-I_aR(N_2/N_1)$$

or $E_3=(I_b-I_a)R(N_2/N_1)$ where $I_a$ corresponds to the current producing a magnetizing force of $H_a$ as shown in FIG. 2 when applied to winding $N_2$.

In this application it can be seen that the contribution of the magnetomotive force of the pedestal $E_3$ is something slightly less than the contribution of the magnetomotive force of the bias current $I_b$ and is opposite in direction thereto. The level of the voltage of the synchronizing pulse $E_4$ in the plot of $V_i$ in FIG. 4 is set so that the synchronizing pulse is large enough to overcome the biasing current $I_b$ and to drive the core C of FIG. 1 well into positive saturation, past the point $B_6$ in FIG. 2, in the direction opposite to that normally occupied by the core C due to the bias current $I_b$. $E_4$ therefore presents a substantially larger volt-second area than $E_2$, assuming the remainder of the network parameters to be unchanged.

With the foregoing voltage levels, $E_3$ and $E_4$, the operation of the circuit will be as follows: Referring to FIG. 4, before the time $t_5$ the bias current $I_b$ maintains the core C in a state of negative saturation, illustrated on the hysteresis loop of FIG. 2 by the point $B_5$. At time $t_5$, the leading edge of the pedestal is applied to the circuit including resistance 10 and signal winding $N_1$, of FIG. 1, and sets up a magnetomotive force opposing the biasing magnetomotive force, but less than the biasing force by approximately the value of $H_a$ shown in FIG. 2. Thus the net magnetizing force acting on the core C travels to the right from the point $B_5$ in FIG. 2, but does not reach the lower right outside knee $B_2$ of the hysteresis loop during the period of time of the application of the pedestal alone, but stops somewhere in the vicinity of $B_1$. At the time $t_6$ in FIG. 4 the leading edge of the synchronizing pulse appears at the signal circuit. This pulse, of voltage level $E_4$, is sufficient to rapidly drive the core out of saturation around the lower outside knee $B_2$ of the hysteresis loop of FIG. 2. The flux in the core C then proceeds up the right-hand side of the hysteresis loop of FIG. 2 beyond the point $B_2$ until it reaches the point of positive saturation $B_6$ in the upper state. During the time of travel, $t_6$ to $t_7$, between the lower and upper states of saturation, the core C is unsaturated and a portion of the synchronizing pulse appears across the winding $N_1$ of FIG. 1, thus giving an indication of the position of the leading edge of the synchronizing pulse. During the time $t_7$ to $t_8$ of FIG. 4, the core remains in the upper state of saturation, so that there is no further change in flux to give rise to a voltage across windings $N_1$ or $N_2$. Upon the arrival of the trailing edge of the synchronizing pulse, at the time $t_8$, the bias current magnetomotive force again exceeds the magnetomotive force developed by the pedestal, and the core C of FIG. 1 is rapidly driven out of positive saturation past the point $B_7$ in FIG. 2, and down the left-hand side of the hysteresis loop of FIG. 2, until the time $t_9$ when it reaches the state of negative saturation at the point $B_1$. During the time $t_8$ to $t_9$ a pulse appears across the winding $N_1$ of FIG. 1 by reason of the changing flux in core C. This pulse, of volt-second area determined by the flux change in core C, has a leading edge corresponding in time to the trailing edge of the synchronizing pulse. At the time $t_{10}$ of FIG. 4 the pedestal trailing edge arrives and the bias current $I_b$ maintains the core C in the lower state of saturation, again out at the point $B_5$ of FIG. 2, preparing it for the reception of the next signal to the input circuit. Thus, with very small time delays, we have achieved aperture clipping of the synchronizing pulse by obtaining an indication of both its leading and trailing edges.

In the use of a synchronizing pulse clipper such as described in a television system, the clipper can be inserted in the last video stage of a television set with no ill effect on the picture. This is because the core is in saturation during the period the picture information is being applied and little or no impedance is presented to the video stage during the picture period. If a pentode is used in the final video stage, yielding a relatively constant current source, the resistor 10 of FIG. 1 need not be present in the synchronizing pulse clipping circuit. This is because resistance 10 serves to limit the current when the core is saturated and with a constant current source this precaution is not necessary.

These pulse clippers may be inserted in a television synchronizing circuit at several points. The saturable inductance clipper can be inserted either directly after the video detector, or after the signal has passed through a sync amplifier following the video detector, or directly after the video amplifier if the video amplifier is linear enough so that there will be no distortion of the signal which might tend to compress the excursion of the synchronizing signal. The synchronizing signal is then fed from the clipper output to a phase comparison tube or phase detector which controls the oscillators in the sweep circuits.

Figure 5:
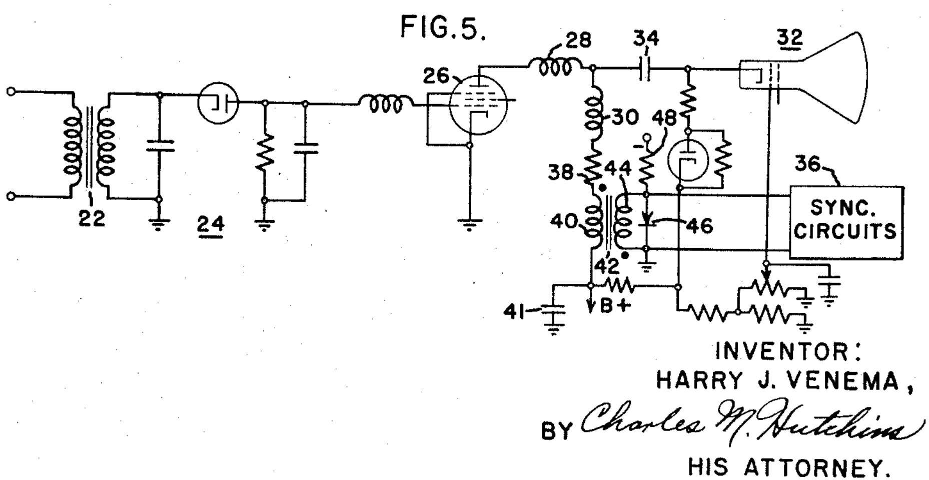
FIG. 5 illustrates schematically a portion of a television receiver utilizing the principles of the invention.

The schematic diagram of FIG. 5 illustrates the application of the invention in a typical television receiver, where the video I.F. transformer 22 is fed with the usual video I.F. signals, demodulated in the detector 24, and applied to the control electrode of the valve 26. The anode circuit of the valve includes the series connected peaking inductors 28 and 30, whose junction is connected to the cathode of the cathode ray display device 32 by way of coupling capacitor 34. The display device 32 may be of the conventional type in which a beam of electrons is projected upon a luminescing screen, and deflected thereover in a regular raster pattern by the use of appropriate and well known deflecting arrangements (not shown). The operation of the deflecting arrangements is maintained in proper relation to the information contained in the video signal by synchronizing circuits, shown generally at 36, which are also well known, per se. The separation of the synchronizing information from the composite NTSC video input signal, and its application to the synchronizing circuits 36 will be discussed below in detail.

The anode circuit of the valve 26 also includes the load resistor 38 connected through the primary winding 40 to a source of anode voltage indicated at B+. A capacitor 41 effectively grounds the anode supply for signal frequency currents. The primary winding 40 is disposed on a core 42 of magnetic material having a high squareness ratio, and coupled therethrough with the secondary winding 44, across which there is connected the diode 46. Poling of the windings 40, 44 and the diode 46 are as indicated on the drawing of FIG. 5. One terminal of the winding 44 is connected with ground, while the other terminal is connected through resistor 48 to an electrical supply point negative with respect to ground. It is to be noted that the poling of the diode 46 is such that the current flowing through the winding 44 by way of resistor 48 flows entirely through the winding, and substantially none is diverted through the diode 46. Voltages appearing across the secondary winding 44 are impressed on the input to the synchronizing circuits 36. The usual D.C. restoration, bias and brightness control circuits are connected with the cathode and control electrode of the display device 32.

The output from the detector circuits 24 presents negative going synchronizing pulses to the control electrode of the valve 26, producing corresponding increments in anode current. The bias current impressed on the winding 44 through the resistor 48 is selected and poled to provide a magnetomotive force on the core 42 which opposes that due to anode current flow through winding 40, and which has a magnitude maintaining the core 42 in a state of saturation for all values of anode current lying between white and black level, but driving the core 42 out of saturation when the anode current flow is reduced or cut-off by a synchronizing pulse, which is in the so-called "blacker-than-black" region. Thus, over the normal video range of anode current excursion, the core 42 is maintained in a state of saturation, whereby substantially no signal voltage appears across either primary 40 or secondary 44, and the coupling network between amplifier 26 and display device 32 operates in the normal manner, as though the winding 40 were not present. In the presence of the synchronizing pulse, however, the core 42 is driven into the unsaturated region by the bias current flowing in winding 44, and the resultant flux change induces an additional positive going voltage at the dotted end of winding 40, which enhances the blanking effect of the synchronizing pulse delivered to the cathode of the display device 32. A negative going pulse appears at the ungrounded end of the winding 44, and the poling of the diode 46 is such that this pulse is not absorbed, and passes to the synchronizing circuits 36.

Assuming that the magnetomotive force due to the bias provided by winding 44 is equal to the magnetomotive force developed by the flow of anode current through winding 40, during the pedestal portion of the composite NTSC signal, the ending of the synchronizing pulse does not produce any change in the magnetic state of the core 42, and no voltages are developed in the associated windings 40 and 44. With the ending of the pedestal portion of the composite signal, current flow through the winding 40 is re-established and the effect of the anode current through winding 40 now overcomes the effect of the bias current through the winding 44, initiating core re-set, and tending to cause the dotted end of winding 40 to swing negatively. This might cause a white bar at the left-hand side of the picture, if permitted to occur, but is prevented by the action of diode 46 which is poled to conduct during core re-set, and prevents this spurious signal from reaching an objectionable level. The short-circuiting action of diode 46 during re-set increases the circuit time constant during this interval, but this is unobjectionable because the entire time of forward line trace is available for core re-set.

Operation can be further improved by so relating the bias current in winding 44 and bias on the amplifier 26, using well known expedients, as to permit the effect of anode current in winding 40 to predominate slightly in the presence of pedestal values of the signal voltage, whereby core re-set is at least partially executed while blanking voltage is available.

While I have shown particular embodiments of my invention, it will be understood, of course, that I do not wish to be limited thereto since many modifications may be made therein by those skilled in the art, to accommodate particular environmental and operating requirements, without departing from the spirit thereof. I, therefore, contemplate by the appended claims to cover any such modifications as fall within the true spirit and scope of my invention.

What I claim as new and desire to secure by Letters Patent of the United States is:

1. In a pulse clipping circuit adapted to isolate a pulse of relatively short time duration superimposed on a pedestal pulse of longer time duration, the improvement comprising a saturable inductance having a core with substantially rectangular major and minor hysteresis loops; means coupled to said core providing a magnetomotive force for biasing said core normally into saturation in one direction; signal means coupled to said core for supplying a pedestal pulse generating a magnetomotive force in said core substantially equal to and opposite in direction to the magnetomotive force generated by said biasing means driving said core to a region of slope change of said major hysteresis loop, and for supplying said pulse of relatively short time duration superimposed on said pedestal pulse and of magnitude sufficient to saturate said core in the direction opposed to said one direction, whereby, when the leading edge of said pedestal is applied to said inductance, said core will be driven toward the unsaturated region whereby said pulse of short time duration will cause said core to enter the unsaturated region and said pulse of short time duration will appear across said inductance, and when the trailing edge of said pulse of short time duration arrives said core will proceed to an outside knee of one of said minor hysteresis loops, thereby generating no voltage across said inductance until the arrival of the trailing edge of said pedestal, whereupon said biasing means will return said core to its initial stage of saturation, said biasing means generating a pulse in said inductance during said return.

2. In a pulse aperture clipping circuit adapted to generate indications of a leading edge and a trailing edge of a synchronizing pulse disposed on a pedestal pulse the improvement comprising a saturable inductance having a core with substantially rectangular major and minor hysteresis loops; means coupled to said core providing a magnetomotive force for biasing said core normally into saturation in one direction; signal means coupled to said core for supplying said superimposed pulses; the pedestal of said superimposed pulses being capable of generating a magnetomotive force of a lower magnitude than the magnetomotive force generated by said biasing means but in opposition thereto, in order to drive said core to a point on said major hysteresis loop in the region of an inside knee of said major loop, toward the unsaturated state, during the time of application of said pedestal before the arrival of the leading edge of said synchronizing pulse; and said synchronizing pulse being capable of saturating said core in the opposite direction of saturation to said one direction before the arrival of the trailing edge of said synchronizing pulse, whereby said core will be driven out of saturation substantially by said leading edge of said synchronizing pulse yielding an indicating pulse across said inductance of said leading edge of said synchronizing pulse, said indicating pulse remaining until said synchronizing pulse has driven said core in said opposite direction of saturation, and whereby said core will again be driven out of saturation substantially by said trailing edge of said synchronizing pulse, said trailing edge then being indicated across said inductance by the voltage appearing thereon during the return of said core through the unsaturated region to the initial stage of saturation.

3. In a television synchronizing system comprising a video detector, a synchronizing signal amplifier and a synchronizing signal detector comprising a saturable inductance coupled to said amplifier having a core with substantially rectangular hysteresis loops; a signal originating from said synchronizing signal amplifier including a pedestal carrying a synchronizing pulse disposed thereon; biasing means coupled to said core for biasing said core into saturation in one direction having substantially equivalent magnetomotive force to and being opposite in direction to the magnetomotive force produced by said pedestal, whereby said core is driven out of saturation during application of said synchronizing pulse so that at least a portion of said pulse will then appear across said inductance to the exclusion of said pedestal and may be utilized for synchronizing.

4. In a television synchronizing system comprising a video detector, a video amplifier and a synchronizing signal detector comprising a saturable inductance coupled to said amplifier having a core with substantially rectangular hysteresis loops; a signal originating from said video amplifier including a pedestal carrying a synchronizing pulse disposed thereon; biasing means coupled to said core for biasing said core into saturation in one direction having substantially equivalent magnetomotive force to and being opposite in direction to the magnetomotive force produced by said pedestal, whereby said core is driven out of saturation during application of said synchronizing pulse so that at least a portion of said pulse will then appear across said inductance to the exclusion of said pedestal and may be utilized for synchronizing.

5. In a television synchronizing system comprising a video detector, and a synchronizing signal detector comprising a saturable inductance coupled to the output of said video detector having a core with substantially rectangular hysteresis loops; a signal originating from said video detector including a pedestal carrying a synchronizing pulse substantially centrally disposed thereon; biasing means for biasing said core normally into saturation in one direction having substantially equivalent magnetomotive force to and being opposite in direction to the magnetomotive force produced by said pedestal, whereby said core is driven out of saturation during application of said synchronizing pulse so that at least a portion of said pulse will then appear across said inductance to the exclusion of said pedestal and may be utilized for synchronizing.

6. In combination, a magnetic circuit characterized by a predominantly rectangular relationship between magnetic flux and impressed magnetomotive force, an electric winding disposed about at least a portion of said magnetic circuit, a source of electric signals characterized by amplitude variation over a first range of values and by amplitude variation over a second range of values connected across said winding for passing current therethrough and thereby exerting a magnetomotive force on said magnetic circuit, means coupled to said magnetic circuit for impressing on said magnetic circuit a magnetic bias having a value maintaining said magnetic circuit in a saturated condition in the presence of signals in said first range and adjusting said magnetic circuit to operate through at least a portion of the unsaturated region in presence of signals in said second range, and means for deriving from said magnetic circuit a signal responsive to magnetic flux changes therein.

7. In combination, a magnetic circuit characterized by a ratio of remanent to saturation flux of at least 0.8, an electric winding disposed about at least a portion of said magnetic circuit, a source of electric signals characterized by amplitude variation in substantially continuous manner over a first range of values and by amplitude variation in substantially discrete manner over a second range of values connected across said winding for passing current therethrough and thereby exerting a magnetomotive force on said magnetic circuit, means coupled to said magnetic circuit for impressing on said magnetic circuit a magnetic bias having a value maintaining said magnetic circuit substantially in a saturated condition in the presence of signals in said first range and adjusting said magnetic circuit to operate through at least a portion of the unsaturated region in the presence of signals in said second range, and means for deriving from said magnetic circuit a signal responsive to magnetic flux changes therein.

8. In a signal responsive system, an electric valve having input and output circuits, means for impressing a signal on said input circuit, a magnetic circuit having a ratio of remanent to saturation flux greater than 0.8, an electric winding disposed about at least a part of said magnetic circuit, a resistance, means serially connecting said resistance and said electric winding in said output circuit, means coupled to said magnetic circuit for impressing a magnetic bias on said magnetic circuit in addition to bias arising from the flow of current in said output circuit, first utilization means responsive to signals derived from flux changes in said magnetic circuit, and second utilization means responsive to signals appearing across said serially connected resistance and winding.

9. In a signal responsive system, an electric valve having input and output circuits with a normal unidirectional flow of current in said output circuit, a magnetic circuit having a ratio of remanent to saturation flux greater than 0.8, an electric winding disposed about at least a part of said magnetic circuit, a resistance, means serially connecting said resistance and said electric winding in said output circuit, means coupled to said magnetic circuit for impressing a magnetic bias on said magnetic circuit with a sense opposing the magnetic influence of said unidirectional output circuit current exerted through said winding, first utilization means responsive to signals derived from flux changes in said magnetic circuit, and second utilization means responsive to signals appearing across said serially connected resistance and winding.

10. In a signal responsive system, an electric valve having input and output circuits with a normal unidirectional flow of current in said output circuit, a magnetic circuit having a ratio of remanent to saturation flux greater than 0.8, an electric winding disposed about at least a part of said magnetic circuit, means connecting said winding in said output circuit, means including a second electric winding disposed about at least a portion of said magnetic circuit for impressing a magnetic bias on said magnetic circuit in a sense opposing the magnetic influence of said unidirectional output circuit current, a rectifier connected across one of said windings with a sense opposing the diversion of normal magnetizing current through said rectifier, and utilization means responsive to voltages appearing across one of said windings.

11. In a signal responsive system, an electric valve having input and output circuits with a normal unidirectional flow of current in said output circuit, a magnetic circuit having a ratio of remanent to saturation flux greater than 0.8, an electric winding disposed about at least a part of said magnetic circuit, a resistance, means serially connecting said resistance and said winding in said output circuit, a common potential connection with said input and output circuits, a capacitor connected between the end of said winding remote from said resistance and said common potential connection, means for impressing on said magnetic circuit a magnetic bias opposing the magnetic bias arising from the normal flow of unidirectional current in said output circuit through said winding, first utilization means responsive to signals appearing between the end of said resistance remote from said winding and ground, and second utilization means responsive to signals derived from flux changes in said magnetic circuit.

12. In combination, a saturable reactor having a saturable core, a primary and a secondary winding thereon mutually coupled through said saturable core, biasing means coupled to said core providing a magnetomotive force for saturating said core in one polarity, a pulse source, repetitively producing a pulse of relatively short time duration superimposed on a pedestal pulse of longer time duration, said short duration pulse providing sufficient magnetomotive force when coupled to said primary winding to exceed the bias of said biasing means and to drive said core out of saturation, means coupling said pulse source to said primary winding in a sense to oppose said saturating means, and means coupled to said secondary winding for deriving an output pulse when said core becomes unsaturated.

13. In combination, a saturable reactor having a saturable core, a primary and a secondary winding thereon mutually coupled through said saturable core, biasing means coupled to said core providing a magnetomotive force for saturating said core in one polarity, a pulse source, repetitively producing a pulse of relatively short time duration superimposed on a pedestal pulse of longer time duration, said pedestal pulse providing a magnetomotive force when coupled to said primary winding substantially equal to the bias of said biasing means, said short duration pulse providing sufficient magnetomotive force to drive said core out of saturation, means coupling said pulse source to said primary winding in a sense to oppose said saturating means, and means coupled to said secondary winding for deriving output pulses as said core passes to and from an unsaturated condition.

14. In the system set forth in claim 11, means for coupling a signal to said input circuit containing pulses having a pedestal upon which is superimposed a second pulse, said pulses being poled to reduce the current in said valve, said magnetic biasing circuit being adjusted to provide a magnetic bias approximating the bias arising from the normal flow of current in said output circuit during the period that said pedestal is applied to said input circuit, and wherein said first means is a video display device.

15. In the system set forth in claim 11, means for coupling a signal to said input circuit containing pulses having a pedestal upon which is superimposed a second pulse, said pulses being poled to reduce the current in said valve, said magnetic biasing circuit being adjusted to provide a magnetic bias slightly less than the bias arising from the normal flow of current in said output circuit during the period that said pedestal is applied to said input circuit, and wherein said first means is a video display device.

References Cited in the file of this patent

UNITED STATES PATENTS

| | | |
|---|---|---|
| 2,539,465 | Parker | Jan. 30, 1951 |
| 2,708,722 | Wang | May 17, 1955 |
| 2,709,225 | Pressman | May 24, 1955 |
| 2,729,808 | Auerbach | Jan. 3, 1956 |
| 2,768,312 | Goodale | Oct. 23, 1956 |
| 2,772,357 | Wang | Nov. 27, 1956 |